Sept. 1, 1959             G. FRIEDRICHS          2,902,651
PROTECTIVE NETWORK SYSTEM FOR AN ELECTRIC
UNIVERSAL MEASURING INSTRUMENT
Filed June 28, 1955
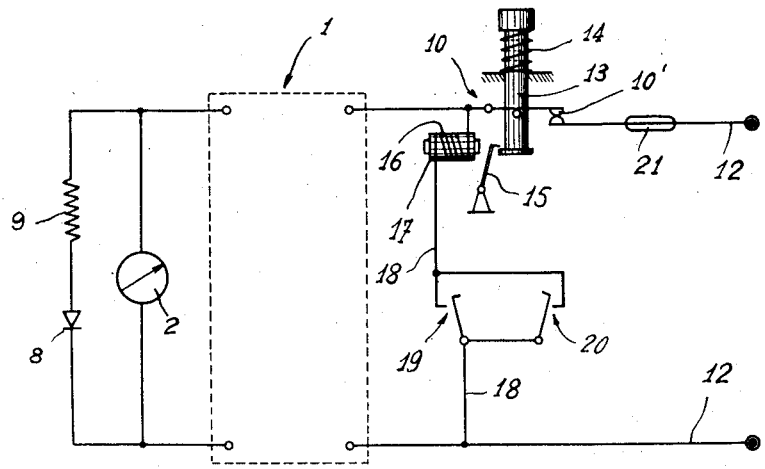
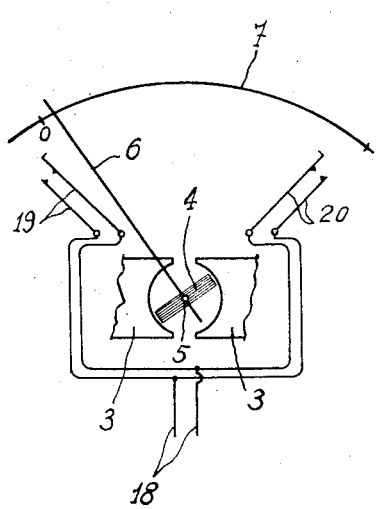
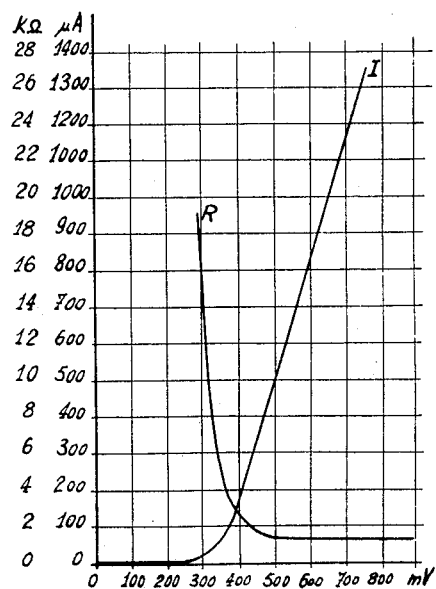
INVENTOR
GEORGES FRIEDRICHS
By Hanie and Nydick
ATTORNEYS

United States Patent Office 2,902,651
Patented Sept. 1, 1959

2,902,651

PROTECTIVE NETWORK SYSTEM FOR AN ELECTRIC UNIVERSAL MEASURING INSTRUMENT

Georges Friedrichs, Annecy, France, assignor to Société Anonyme dite: Compagnie Generale de Metrologie, Annecy, France Application June 28, 1955, Serial No. 518,468

Claims priority, application France December 22, 1954

9 Claims. (Cl. 324—110)

The present invention relates to circuit means for protecting an electric measuring instrument, and more particularly a universal measuring instrument suitable for measuring voltages, currents, resistances and capacitances.

It is known to provide for universal measuring instruments of the general kind above referred to, several protective networks each of which is arranged to protect a certain measuring range, or a certain part of the instrument such as a galvanometer. Protection of the range for which the instrument is set is obtained by rendering operative simultaneously the measuring range for the part of the instrument to be used and the respective network. Such a protective system is rather unsatisfactory as it involves complex networks and switching means. The system tends to become so complicated that in practice it is usual to omit the protection of at least some of the measuring ranges or parts of the instrument.

One of the objects of the present invention is to provide a novel and improved network system which is common to all the ranges and parts of the instrument and which protects all the ranges and parts without requiring switching of the network system when the instrument is set for a different measuring operation and without adversely affecting the sensitivity and accuracy of the instrument.

Another object of the invention is to provide a novel and improved network system for an instrument of the general kind above referred to, which affords full protection for ranges starting as low as a fraction of a volt or a few micro-amperes, as well as for ranges measuring capacitances or resistances.

The upper limit of the respective protected range depends, of course, upon the design of the specific instrument but it may be noted that instruments are generally especially vulnerable at the low measuring ranges.

Still another object of the invention is to provide a novel and improved network system for an instrument of the general kind above referred to, the components of which are so correlated that the network system is responsive to any harmful or unsuitable voltages or currents to which the instrument may be subjected when in use.

As appears from the previous and the subsequent discussion of the invention, the usefulness of the invention is not limited to the protection of instruments having the aforementioned measuring ranges but extends to all electromagnetic measuring instruments for measuring an electric magnitude, and more generally to instruments for measuring any physical magnitude, provided only that the magnitude is expressed as an electric magnitude measurable by an instrument including an electromagnetic indicating component actuating a pointer or needle. Instruments measuring physical magnitudes and suitable for protection by the network system of the invention may be strain gauges, pressure gauges, etc.

Other and furthere objects and advantages of the invention will be pointed out hereinafter and set forth in the appended claims forming part of the application.

In the accompanying drawing a preferred embodiment of the invention is shown by way of illustration and not by way of limitation.

In the drawing:

Fig. 1 is a circuit diagram of a universal measuring instrument associated with a protective network system according to the invention.

Fig. 2 is a diagrammatic detail view of the indicating component of the instrument and of the part of the network system directly coacting therewith and, Fig. 3 is a graph showing the current and resistance curves of a rectifier constituting another component of the network system.

Referring now to the figures in detail, the universal measuring instrument 1 to be protected is symbolized by a dotted block and includes a galvanometer 2. As shown in Fig. 2, the galvanometer comprises magnets 3, 3, between the pole faces of which a frame or coil 4 is mounted on an arbor 5 also seating a needle or pointer 6. The pointer coacts with a scale 7 shown as a voltage range scale.

The protective network system comprises a circuit including a rectifier 8 such as a single-cell rectifier and a resistor 9 connected in series with each other and in parallel with the galvanometer. It further comprises a suitably sensitive electromagnetic switch 10 controlling switch contacts 10' included in one line of a D.-C. power supply 12. The movable contact of these switch contacts is controlled by a push button plunger 13 biased by a loaded spring 14 into a position in which contacts 10' are disengaged. The plunger is retained in its contact closing position by a latch or hook 15 which in turn is controlled by the energization of a coil 16 of the switch. As is apparent, latch 15 when attracted by core 17 of the switch, releases plunger 13 and the switch remains open until plunger 13 is depressed, generally manually.

The switch coil is connected across the lines of power supply 12 by a lead 18. This lead includes two pairs of spring contacts 19 and 20 more fully shown in Fig. 2. The contacts of each pair are biased into the open position and are closeable by engagement with pointer 6. To this end contacts 19 and 20 are disposed closely adjacent to the respective limit positions of the pointer. As is apparent, closing of either pair of contacts completes the energizing circuit of coil 16.

The protective network finally includes a heat responsive safety means shown as a fuse 21 in the line of power supply 12 leading to switch 10.

Due to the connection of the rectifier in parallel with the coil or frame 4 of the galvanometer, the resistance of the rectifier decreases when a voltage is applied to the instrument causing the pointer of the galvanometer to move along its scale. For indications of the pointer between the zero position and the end of scale position, that is, for indications within the normal measuring range, the resistance of the rectifier in comparison with the resistance of the galvanometer frame or coil remains so high that its effect upon the sensitivity of the galvanometer is negligible. However, when the galvanometer is subjected to a voltage surge, the resistance of the rectifier decreases strongly and the major portion of the current caused by the voltage surge at the terminals of the galvanometer is shunted through the rectifier.

Fig. 3 shows the characteristic of the rectifier, curve I representing the current passing through the rectifier and curve R the resistance of the rectifier as a function of the voltage applied to its terminals.

Let it be assumed that pointer 6 reaches the end of scale 7 when 38 micro-amps flow through coil 4 and that the voltage at the terminals of the galvanometer is 76 micro-volt when the internal resistance of the galvanometer is 2000 ohm. If now a voltage surge ten times as high occurs, that is 760 mv., the current through the coil or frame 4 rises from zero to approximately 50 microamps in 500 milliseconds. Curve I shows that during this time 1360 micro-amps will pass through the rectifier, that is, approximately 27 times the current which flows through the galvanometer coil 4. After 500 milliseconds pointer 6 reaches contacts 20 with sufficient force to close the same thereby energizing coil 16 and hence causing interruption of power supply 12 by release of switch 10.

As is apparent from Fig. 2, pointer 6 when reaching contacts 20 has travelled the full length of the scale. Due to the rate of speed of the pointer as a result of the excessive load applied to the instrument the pointer has or may have accumulated sufficient kinetic energy to become damaged upon being rather abruptly stopped by engagement with contacts 20. To prevent such damage it is necessary to retard the movement of the pointer before engaging contacts 20 associated with the end of the scale.

On the other hand, when the pointer moves off its scale to the left of its zero position, for instance in response to the application of a D.-C. voltage with reversed polarity, the pointer has travelled only a short distance before reaching contacts 19. Accordingly, its kinetic energy is low and it is neither necessary nor desirable to retard the pointer movement as such retardation would make the kinetic energy of the pointer too low to effect closing of contacts 19.

One of the essential features of the invention is to provide means which adapt the rate of speed of the pointer to the aforedescribed conditions so that damage to the galvanometer is prevented and at the same time closing of the respective contacts 19 or 20 is assured. These means will now be described.

When the pointer is moving toward the end of the scale under the influence of a voltage surge, the galvanometer coil constitutes a substantial impedance relative to the then lowered resistance of the rectifier As a result, the rate of speed of the pointer movement is considerably reduced and the same reaches the end of the scale and contacts 20 with a velocity incapable of damaging the galvanometer pointer but still sufficient to close contacts 20.

By suitably selecting the resistance of the rectifier, the rate of speed of the pointer may be conveniently controlled to attain the aforedescribed purpose. For instance, the rectifier may have a characteristic such that its resistance is at least 100 times that of the galvanometer coil for voltages sufficient to turn the pointer to the end of its scale but still not excessive, and that this resistance decreases rapidly in response to dangerous voltage surges. The pointer speed is further controllable by means of resistor 9. The resistance value of this resistor which may be variable, is so selected that in conjunction with the rectifier it prevents the pointer from moving at a rate of speed which is too slow for closing contacts 20.

If the pointer moves off the scale beyond its zero position due to the application of a direct voltage of reversed polarity, the rectifier remains ineffective. This is desirable since as previously mentioned, the pointer cannot accumulate an appreciable kinetic energy due to its short distance of travel in that direction. Hence, any damping of the pointer speed would prevent closing of contacts 19.

The rectifier and the contacts 19 and 20 also cooperate to protect the instrument when the same is set for a direct voltage or current range and an alternating voltage is accidentally applied. In such event, the major part of the half-waves which cause the pointer to move the pointer towards the end of its scale pass through the rectifier so that their effect is not sufficient to move the pointer to the end of the scale and in any event not with a speed such that it will close contacts 20. The other half-waves which cause movement of the pointer toward contacts 19 do not pass through the rectifier so that the rate of speed of the pointer movement into the latter direction is not damped and hence sufficient to close contacts 19 thereby opening contacts 10'.

Accordingly, the rectifier automatically controls the rate of speed of the pointer movement both, in the direction toward the end of the scale and in the opposite direction. The fact that the pointer movement is not dampened in the direction off the scale does not damage the galvanometer in case of an overload since in that direction the short travel of the pointer prevents a dangerous accumulation of kinetic energy.

While the coaction of rectifier, contacts 19 and 20 and the switch is capable of protecting the instrument from most overload conditions there are conditions possible in which it does not afford protection.

Generally a voltage surge equal to or lower than the minimum voltage required to operate switch 10 will not damage the instrument. However, if the internal resistance of the instrument is very low, for instance when it is set for a current range, a current high enough to damage the instrument but not having the minimum voltage required to operate switch 10 may occur. In that event, protection is afforded by fuse 21. The calibration of this fuse is such that it permits passage of the highest current that is safe but cuts off in response to a current surge above the safe current.

Furthermore, the reaction time of the protective network system, that is the time required by the pointer to close the respective contacts 19 and 20 and the switch 10 to open its contacts 10' may be too slow to prevent damage to the instrument. Such a situation may occur when the instrument is set for measuring current. In such event, some of the resistors included in the instrument may become overheated during the reaction time. To prevent such overheating, the reaction of the fuse is selected so that it interrupts the power supply before the resistors become overheated.

As is now evident, the various components of the protective network system complement each other to afford protection of the instrument under all conceivable conditions.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. A protective network system for protecting from voltage and current surges and faulty polarity a multiple range measuring instrument having an electromagnetic indicating component including a coil and a pointer movable between two limit positions one being the zero position and the other the position of maximum indication of the pointer, said network comprising a rectifying means connected in an energizing circuit with said instrument and parallel to the coil thereof, electromagnetic switch means including normally closed cut-off switch contacts in said energizing circuit and coil means controlling the opening of said switch contacts, and auxiliary circuit means connected to said energizing circuit in parallel with said instrument, said auxiliary circuit means including said switch coil means and two pairs of normally open contacts connected in parallel with each other and in series with the switch coil means, each of said pairs of contacts being disposed adjacent to one limit position of the pointer and closeable by the pointer upon movement thereof into the respective direction, closing of either pair of said contacts closing the energizing circuit for said switch coil means thereby effecting opening of said cut-off contacts, said rectifying means having a resistance characteristic such that below a predetermined voltage in the energizing circuit the resistance of the rectifying means is high relative to the resistance of the instrument coil for causing the major part of the current to flow through the said coil and that above said predetermined voltage the resistance of the rectifying means is low relative to the resistance of the said coil for causing the major part of the current to flow through the rectifying means whereby the rate of speed of the pointer movement toward said position of maximum indication is damped to prevent damage to the pointer upon contact of the pointer with the respective pairs of contacts.

2. A network system according to claim 1 and further comprising resistance means connected in series with said rectifying means.

3. A network system according to claim 1 and further comprising safety means responsive to a current overload included in said energizing circuit anterior of said instrument.

4. A network system according to claim 3, wherein said safety means comprise a fuse included in the positive line of a D.-C. energizing circuit.

5. A network system according to claim 4, wherein said fuse is gauged to interrupt said energizing circuit in response to a current load slightly above the permissible current load of the current measuring range of the instrument.

6. A network system according to claim 1, wherein said electromagnetic switch means comprise a movable plunger, one of the switch contacts being movable in unison with said plunger, loaded yieldable means biasing said plunger into a position in which the movable switch contact is disengaged from the other switch contact, and retaining means retaining the plunger in its contact closing position, said retaining means being releasable by energization of said switch coil means.

7. A network system according to claim 1, wherein said rectifying means is a uni-cellular rectifier.

8. A network system according to claim 1, wherein said indicating component comprises a galvanometer.

9. A network system according to claim 1, wherein the pair of contacts associated with the zero position of the pointer is disposed adjacent to said zero position so that the pointer is engageable with said contacts for closing the same upon movement of the pointer in the direction opposite the maximum position and beyond the zero position.

References Cited in the file of this patent

UNITED STATES PATENTS

| | | |
|---|---|---|
| 1,960,068 | Ruppel | May 22, 1934 |
| 2,543,680 | Veevers | Feb. 27, 1951 |
| 2,584,800 | Grisdale | Feb. 5, 1952 |
| 2,671,874 | Friedrichs | Mar. 9, 1954 |
| 2,789,254 | Bodle | Apr. 16, 1957 |

FOREIGN PATENTS

| | | |
|---|---|---|
| 1,004,398 | France | Nov. 28, 1951 |
| 899,825 | Germany | Dec. 17, 1953 |